No. 703,725. Patented July 1, 1902.
F. HARDINGE.
LENS MEASURING INSTRUMENT.
(Application filed July 12, 1900.)
(No Model.)
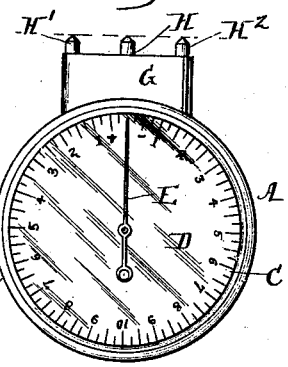
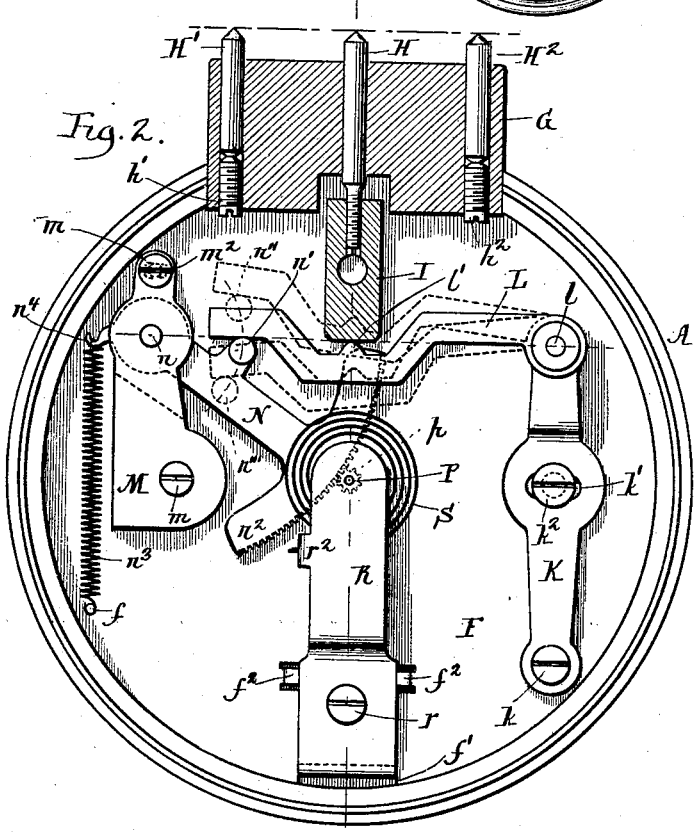
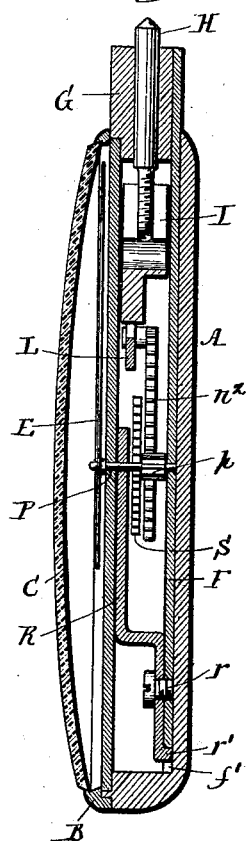
Witnesses:
Fred Gerlach
Alberta Adamuck
Inventor:
Franklin Hardinge
By Fisher
his Attorneys

UNITED STATES PATENT OFFICE.

FRANKLIN HARDINGE, OF CHICAGO, ILLINOIS, ASSIGNOR TO GENEVA OPTICAL COMPANY, OF CHICAGO, ILLINOIS, A CORPORATION.

LENS-MEASURING INSTRUMENT.

SPECIFICATION forming part of Letters Patent No. 703,725, dated July 1, 1902.

Application filed July 12, 1900. Serial No. 23,293. (No model.)

*To all whom it may concern:*

Be it known that I, FRANKLIN HARDINGE, a citizen of the United States, residing at Chicago, in the county of Cook and State of Illinois, have invented certain new and useful Improvements in Lens-Measuring Instruments, of which the following is a specification, reference being had to the accompanying drawings.

The object of the invention is to construct an instrument by the use of which the focal length of cylindrical and spherical lenses may be obtained by direct reading of the suitably-graduated dial.

A further object of the invention is to provide such an instrument with adjustments for the various parts of such a nature that the instrument may be not only accurately adjusted when the parts are assembled, but may also be easily and quickly adjusted without taking the instrument apart by the user of the instrument after it has left the hands of the manufacturer.

The invention relates to that class of lens-measures having three or four relatively fixed and movable points, a pointer movable over a graduated dial, and lever mechanism and gearing of peculiar construction which may be accurately adjusted and whereby the varying focal lengths of convex and concave lenses of the same radius of curvature will be properly indicated on a uniformly-graduated dial, or, in other words, to provide a construction by which concave and convex lenses of the same focal length which slightly differ in their respective radii of curvature will be accurately measured on a uniformly-graduated scale.

The preferred form of my invention is set forth in the following description and illustrated in the accompanying drawings, and the features of the invention are specifically set forth in the claims at the end of the specification.

In the drawings, Figure 1 is a plan view of my improved instrument. Fig. 2 is a similar view, enlarged, with the dial removed and with parts in section. Fig. 3 is a sectional view on line 3 3 of Fig. 2.

A is a casing provided with a bezel B, in which is set a crystal C.

D indicates a graduated dial suitably secured within casing A, and E is a pointer movable over the face of the dial.

F is a disk or plate upon which all the movable parts of the instrument are mounted. This plate is preferably circular in form and fitted removably, but securely, within casing A. Suitably secured by brazing and dowel-pins to a projection $f$ of plate F is a boss G, which projects through an opening in the periphery of casing A. Mounted in boss G are three contact-pieces H, H', and $H^2$, preferably of hardened steel, against which the lens to be measured is pressed. The two outer contact-pieces H' and $H^2$ are fitted tightly within corresponding holes drilled in boss G, so as to be frictionally held in place, and abut against adjusting-screws $h'$ $h^2$, threaded into the inner ends of the holes. The central contact-piece H is fitted accurately within a correspondingly-drilled hole in boss G, but loosely enough to permit it to freely move longitudinally. The inner end of contact-piece H is screw-threaded in a split spring-nut I, whereby it is frictionally held in place.

K is a bent arm pivotally secured at one end by a screw $k$ to the plate F. At its opposite end a lever-arm L is pivoted, as at $l$, said lever L being normally arranged at right angles to arm K and to contact-piece H. Midway between its ends lever L is provided with a rounded projection $l'$, which abuts against the inner end of the nut I. The arm K is normally stationary, so that the pivot $l$ is normally fixed; but by providing arm K with a slot $k'$, through which passes a screw $k^2$, the lever L and its pivot $l$ are conveniently adjustable in the direction of its length and relatively to contact-piece H. Pivotally mounted at $n$ on an adjustable piece M is a second lever N.

$n'$ is a cylindrical pin secured to a lug on lever N and which is engaged by the free end of lever L. The free end of lever N is formed into a toothed segment $n^2$, which engages a pinion $p$ on shaft P, which shaft carries on its outer end the pointer E. The piece M is pivotally secured at one end to plate F by screw $m$ and is adjustably secured in place by a screw $m'$, passing through a slot $m^2$ in piece M. By this arrangement the toothed segment $n^2$ is movable to and from the pinion $p$, so that the teeth of the segment may be adjusted to accurately mesh with the teeth of the pinion, and a delicate and accurate operation of the instrument is secured. A tension-spring $n^3$ is secured to a projection $n^4$ of lever N and to a pin $f$ on plate F. This spring tends, through the medium of levers N and L and nut I, to force the contact-piece H outwardly.

The outer end of shaft P is journaled in a bent strip of metal R, secured to plate F by a screw $r$ and held against lateral displacement by a bent end $r'$, engaging a notched part $f'$ of plate F, and by projections $f^2 f^2$, stamped from the body of the metal of plate F and bent to engage the sides of strip R. A hair-spring S is attached to a lug $r^2$ and to shaft P, so as to take up all backlash between toothed section $n^2$ and the pinion $p$.

The dial D may be graduated in any suitable manner, but is preferably uniformly graduated, as shown in Fig. 1, to indicate the power of the lens in diopters. If a plane surface be pressed against the contact-pieces H H' H², the pointer E will stand at zero. If a convex lens is to be measured, the pointer will be moved to the plus (+) side of the dial, whereas a concave lens will permit the pointer to recede to the minus (−) side in the manner well understood in the art.

To obtain the proper relative movements of the contact-piece H and the pointer F, the lever L is adjustable, as described, to vary the relative movements of these parts, the proper ratio of movement being determined by testing the instrument with lenses of known curvature. Also by means of this adjustment the instrument may be set to accurately measure lenses of different materials in the manner well known in the art. In other instruments this adjustment has been attached to the fulcrum of the toothed segment and the movable contact-piece is arranged to operate directly on this toothed segment; but with such an arrangement the adjusting of the toothed segment is apt to alter the accurate meshing of its teeth with the pinion attached to the pointer-shaft. In my instrument, however, after the segment is once adjusted to accurately engage this pinion its fulcrum is firmly held against further movement, and adjustable lever L is interposed between the segment and the movable contact-piece, whereby the ratio of movement between these parts may be easily varied as required without affecting the delicacy of operation of the instrument.

A still further advantage of my peculiar arrangement of interposed levers is that, as shown in Fig. 2, when a plane surface is pressed against the contact-points and the pointer is at zero then the pivots $l$ and $n$ of levers L and N and contact-points $l'$ and $n'$ are all in the same line. The lever movement is, therefore, practically a straight-line movement, and the successive intervals through which the lever L is moved on either side of this line of centers by convex and concave lenses of varying curvatures are uniform and directly proportional to the variations in curvatures of such lenses. Furthermore, by this arrangement of levers I am enabled to accurately measure both concave and convex lenses on a uniformly-graduated scale. As is well known, a convex lens does not have the same plus (+) focal length as the minus (−) focal length of a concave lens of the same curvature and constructed of the same material, because the focal length varies slightly with the variations of the thickness of the lens, and convex lenses are necessarily thicker than concave lenses. So, therefore, if the leverage of the instrument is of such a nature that the ratio of movement between the movable contact-piece H and the pointer E is the same both on the plus and minus side of dial the reading of the instrument will not be exact upon a uniformly-graduated dial. However, by the peculiar arrangement of levers L and N at an angle to one another and by slightly rounding contact-lug $l'$ and by making the pin $n'$ cylindrical I am enabled to vary the leverage of the arm L to allow for the difference in curvature of convex and concave lenses. I have shown the pin $n'$ in exaggerated extreme positions $n''$ and $n'''$, together with the arm L, in dotted lines in Fig. 2. It will be obvious that when the arm L is below the line of centers its leverage is greater than when it is above the line of centers, so that the pointer F will be moved through an arc to the left by a convex lens slightly greater than the arc through which it will be moved to the right by a convex lens of the same radius of curvature. The amount of this variation will of course depend on the size of the length of the lever-arms and the size of the length of the lever-arms and the pin $n'$. The proper size of the pin is used to give the required variation with lenses constructed of the kind of glass which is the one most commonly in use. By this expedient concave and convex lenses of the same radius of curvature, but with slightly-different radii of curvature, or of the same radii, but with the same focal length, will be accurately measured in a uniformly-divided scale.

The instrument may be further adjusted so that it will stand at zero when a plane surface is pressed against with the contact-pieces by moving the contact-pieces H' H² by means of screws $h'$ $h^2$ until they assume the proper position relatively to contact-piece H and to bring the points of these pieces at equal distances from the central shaft P.

In assembling the instrument the lever L is approximately adjusted to produce correct readings and the dial, pointer, and crystal are put in place. The adjustment of the instrument is then regulated to give absolutely correct readings by screwing the movable contact-piece H into or out of the split spring-nut I. By this secondary adjustment the instrument may be adjusted without taking it apart, and the user of the instrument by the same means can properly adjust it to compensate for wear, &c., after it has left the hands of the manufacturer, whereas heretofore with similar instruments it has been necessary to remove the crystal, pointer, and dial, adjust the instrument, and then reassemble the parts. This not only involves an amount of time and labor, but it is difficult to properly adjust the instrument unless the dial and pointer are in position. It is often necessary with former instruments to assemble the parts several times in order to test the accuracy of the instrument before the parts are correctly adjusted. It is obvious that with my device the necessity of such a laborious procedure is entirely obviated. Furthermore, by means of this secondary adjustment the position of the lug $l'$ may be varied slightly above or below the line of centers between pivots $l$ and $n$, so that the variations of the leverage L will be altered. By this expedient I am able to compensate for the differences between concave and convex lenses of different materials having different densities and retain a uniform size for pin $n$ instead of varying the size of such pin to measure lenses of different materials. This adjustment also does away with the clumsy method of adjustment heretofore used—namely, that of filing the contact-points, which were formerly made of soft metal for this purpose and liable to wear, whereas I can make these contact-pieces of hardened steel, which will resist wear.

I do not wish to be limited to the exact details of construction set forth. These details may obviously be varied in many ways by the skilled mechanic.

Having thus described my invention, what I claim as new, and desire to secure by Letters Patent, is—

1. The combination in a lens-measure, of a pair of normally fixed contact-pieces, an intermediate movable contact-piece located in the plane of said fixed contact-pieces, each of said contact-pieces being independently and longitudinally adjustable in indicating mechanism operated by said movable contact-piece.

2. The combination in a lens-measure, of an inclosing casing, fixed contact-pieces projecting exteriorly of said casing and a movable contact-piece extending therethrough, indicating devices within the casing by which the relative positions of said contact-pieces are shown, comprising a pointer, an adjustable mechanism arranged to actuate said pointer and a part loosely contacting with said adjustable mechanism to which part said movable contact-piece is adjustably connected.

3. The combination in a lens-measure, of an inclosing casing, fixed contact-pieces projecting exteriorly of said casing, and a movable contact-piece extending therethrough, indicating devices within the casing by which the relative positions of said contact-pieces are shown, comprising a pointer, pivoted lever mechanism arranged to actuate said pointer and having its fulcrum adjustable and a part loosely contacting with said lever mechanism into which said movable contact-piece is adjustably threaded.

4. The combination in a lens-measure, of fixed and movable contact-pieces, indicating devices by which their relative positions are shown, said indicating devices comprising a pointer movable over a suitably-graduated scale and two independently-pivoted levers successively interposed between the contact-pieces and said pointer, one of said levers being operatively engaged by said movable contact-piece and having its fulcrum adjustable and its free end engaging the other of said levers.

5. The combination in a lens-measure, of fixed and movable contact-pieces, indicating devices by which their relative positions are shown, said indicating devices comprising two independently-pivoted levers movable in the same plane successively interposed between the contact-pieces, and a pointer movable over a suitably-graduated scale, one of which levers is operatively engaged by a movable contact-piece and whose free end engages the other of said levers, the engaging point between said contact-piece and said lever, the engaging point between said levers and the pivots of said levers normally lying in the same straight line.

6. In a lens-measure, the combination of fixed and movable contact-pieces, indicating mechanism by which their relative positions are shown, comprising a pair of coacting arms or levers successively interposed between said contact-pieces and a pointer movable over a suitably-graduated scale, and a movable part engaging one of said arms or levers to which part a movable contact-piece is adjustably secured.

7. The combination in a lens-measure, of contact-points, indicating devices by which their relative positions are shown, said indicating devices comprising a lever interposed between the contact-points and means for operating a pointer movable over a suitably-graduated scale, the fulcrum of said lever being adjustable, and the free end thereof engaging a second lever which in turn operatively engages said means.

8. The combination in a lens-measure, of contact-points, indicating devices by which their relative positions are shown, said indicating devices comprising a lever interposed between the contact-points and means for operating a pointer movable over a suitably-graduated scale, the fulcrum of said lever being mounted on a normally stationary adjustable part, and the free end thereof engaging a second lever which in turn operatively engages said means.

9. The combination in a lens-measure, of contact-points, indicating devices by which their relative positions are shown, said indicating devices comprising a lever interposed between one contact-point and means for operating a pointer movable over a suitably-graduated scale, the fulcrum of said lever being mounted on a normally stationary, adjustable, pivoted arm, and the free end thereof operatively engaging a second lever which in turn operatively engages said means.

10. The combination in a lens-measure, of contact-points, indicating mechanism by which their relative positions are shown, comprising a pointer movable over a suitably-graduated scale, a movable member arranged to actuate said pointer and a pivoted lever interposed between one contact-point and said movable member, said lever having its fulcrum adjustable and its free end loosely engaging said movable member, so that the adjustment of said lever will not affect said member.

11. The combination in a lens-measure, of fixed and movable contact-pieces, indicating mechanism by which their relative positions are shown, comprising a pointer movable over a suitably-graduated scale, a movable member operatively geared to said pointer, and a pivoted lever interposed between said movable contact-piece and said movable member, said movable contact-piece loosely contacting with said lever and said lever having its fulcrum adjustable and its free end loosely engaging said movable member.

12. The combination in a lens-measure, of fixed and movable contact-pieces, indicating mechanism by which their relative positions are shown, comprising a pointer movable over a suitably-graduated scale, a movable member operatively geared to said pointer, a pivoted lever interposed between said movable contact-piece and said movable member, said lever having its fulcrum adjustable and its free end loosely engaging said movable member, and a part loosely engaging said pivoted lever to which said movable contact-piece is adjustably connected.

13. The combination in a lens-measure, of fixed and movable contact-pieces, indicating mechanism by which their relative positions are shown, comprising a pointer movable over a suitably-graduated scale, a pivoted lever operatively geared to said pointer, a second pivoted lever having its fulcrum adjustable and its free end loosely engaging said first-mentioned lever, and a part loosely contacting with said second lever into which said movable contact-piece is adjustably threaded.

14. The combination in a lens-measure, of contact-pieces, indicating devices by which their relative positions are shown, said indicating devices comprising a pair of independently-pivoted levers successively interposed between the contact-pieces and gearing moving a pointer over a suitably-graduated scale, the free end of one of said levers operatively engaging the other of said levers and the fulcrum of the first of said levers being adjustably mounted to vary the operation of the instrument, and that of the second being adjustably mounted to vary the meshing of the gearing.

15. The combination in a lens-measure, of contact-points, indicating devices by which their relative positions are shown, said indicating devices comprising a pivoted lever interposed between said contact-points and mechanism for operating a pointer movable over a suitably-graduated scale, the free end of said lever operatively abutting against a contact-surface secured to said mechanism, the parts being so related that the distance between the point of contact of said lever and said surface and the pivot of the lever will vary as said lever oscillates.

16. The combination in a lens-measure, of contact-points, indicating devices by which their relative positions are shown, said indicating devices comprising a pair of independently-pivoted levers successively interposed between the contact-points and a pointer movable over a suitably-graduated scale, one of said levers operatively engaging a cylindrical pin mounted upon the other of said levers whereby the leverage of the first of said levers varies as said lever oscillates.

17. A lens-measure comprising a casing, a metal plate fitted within said casing upon which the operative parts are mounted, a pointer movable over a suitably-graduated scale, a shaft upon which said pointer is mounted, the inner end of said shaft journaled in said plate and the outer end journaled in a bent strip, the end of which strip is bent to engage a notch in said plate and projections stamped from the body of said plate and abutting against either side of said strip.

FRANKLIN HARDINGE.

Witnesses:
HARRY L. CLAPP,
ALBERTA ADAMICK.